H. K. HORTON.
Fire Kindler.
No. 86,838.        Patented Feb. 9, 1869.
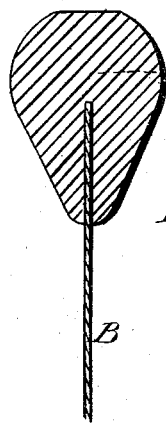

UNITED STATES PATENT OFFICE.

HENRY K. HORTON, OF WINFIELD, MICHIGAN.

IMPROVEMENT IN FIRE-KINDLERS.

Specification forming part of Letters Patent No. 86,838, dated February 9, 1869.

*To all whom it may concern:*

Be it known that I, HENRY K. HORTON, of Winfield, in the county of Ingham and State of Michigan, have invented a new and useful Improved Fire-Kindler; and I do hereby declare and make known that the following is a full, clear, and exact description of the same, reference being had to the accompanying drawing, which, with the letters and figures marked thereon, form part of this specification.

My said invention consists in forming a bulb or ball of some porous non combustible substance or compound, which may be saturated with inflammable oil or fluid, so that upon being ignited it will form a flame of sufficient heat and durability to ignite fuel for fires, the said bulb or ball being provided with a rod and handle to facilitate the handling and use of the same, as hereinafter set forth, making a very useful and convenient article or implement for kindling or lighting fires.

To enable those skilled in the art to understand how to construct and use my said invention, I will describe the same with particularity, reference being made in so doing to the aforesaid drawings, in which—

Figure 1 represents a side view of my invention; and Fig. 2 is a section of the porous bulb, showing the connection of the iron rod of the handle therewith.

The porous bulb or head (marked A) is made of the following ingredients, and in the proportions specified: I take four quarts of dried and pulverized clay, one quart of fine flour, and one pint of fine salt; mix the same and wet with water, so as to mingle the several articles uniformly and thoroughly. This mixture is then pressed in molds of suitable shape and size, forming the bulbs or heads of the kindler, which are then burned in a fire for about twenty or thirty minutes, which burns out the inflammable or combustible portions, leaving the bulk the same as before, but making the same very porous. A rod of iron is then suitably attached or fastened thereto, as indicated at B, to the end of which a wooden handle, C, is secured, so that the implement or utensil can be grasped by the hand, and the head thereof dipped in kerosene or other inflammable fluid or oil, ignited with a match, and held under the fuel to be lighted as long as necessary, without burning the hand of the operator.

Instead of the particular ingredients above described for making the head A, any other consumable articles or substance can be mingled with the non-combustible clay, if desired.

Having described the nature and operation of my invention, as well as the mode of preparing or manufacturing the same, I will specify what I claim and desire to secure by Letters Patent.

I claim, as a new article of manufacture, a fire-kindling implement composed of a porous head, A, and a handle, B C, as herein shown and described.

HENRY K. HORTON.

Witnesses:
J. R. VAN VELSOR,
E. P. VAN VELSOR.